United States Patent
Gengerke

(10) Patent No.: US 9,961,830 B2
(45) Date of Patent: May 8, 2018

(54) COMBINE CORNHEAD ROW UNIT FOR REDUCING FIELD YIELD LOSSES

(71) Applicant: LEADING EDGE INDUSTRIES, INC., Groton, SD (US)

(72) Inventor: Shawn Gengerke, Groton, SD (US)

(73) Assignee: S7 IP Holdings LLC, Groton, SD (US)

( * ) Notice: Subject to any disclaimer, the term of this patent is extended or adjusted under 35 U.S.C. 154(b) by 0 days. days.

(21) Appl. No.: 15/039,163

(22) PCT Filed: Dec. 5, 2014

(86) PCT No.: PCT/US2014/068768
§ 371 (c)(1),
(2) Date: May 25, 2016

(87) PCT Pub. No.: WO2015/085161
PCT Pub. Date: Jun. 11, 2015

(65) Prior Publication Data
US 2017/0164555 A1    Jun. 15, 2017

Related U.S. Application Data

(60) Provisional application No. 61/912,621, filed on Dec. 6, 2013.

(51) Int. Cl.
*A01D 45/02*  (2006.01)
*A01D 41/12*  (2006.01)
*A01F 12/46*  (2006.01)

(52) U.S. Cl.
CPC .......... *A01D 41/12* (2013.01); *A01D 45/023* (2013.01); *A01D 45/025* (2013.01); *A01F 12/46* (2013.01)

(58) Field of Classification Search
CPC .... A01D 45/02; A01D 45/021; A01D 45/023; A01D 45/025; A01D 41/12; A01F 12/46
USPC ........................................ 56/59–62, 106–113
See application file for complete search history.

(56) References Cited

U.S. PATENT DOCUMENTS

| 4,233,804 | A | * | 11/1980 | Fischer ............... A01D 45/025 56/104 |
| 4,845,930 | A | | 7/1989 | Dow |
| 5,269,126 | A | * | 12/1993 | Kalverkamp ........ A01D 45/021 56/500 |
| 5,865,019 | A | | 2/1999 | Hurlburt et al. |
| 6,237,312 | B1 | | 5/2001 | Becker |
| 8,171,708 | B2 | | 5/2012 | Calmer |
| 8,820,039 | B2 | | 9/2014 | Werning |

(Continued)

FOREIGN PATENT DOCUMENTS

EP    2335470    6/2011

*Primary Examiner* — John Weiss
(74) *Attorney, Agent, or Firm* — Nikolai & Mersereau, P.A.; Thomas J. Nikolai

(57) ABSTRACT

Modifications to row unit that result in a greatly reduced loss of kernels due to chatter include substituting stripper plates that have rails upwardly projecting guard rails at the edges of the stripper plates that define their working gap to thereby inhibit escape of loose kernels. Further, the ear transport paddles are modified so as to reduce shelling due to chatter and to move loose kernels collected on the stripper plates to the machine's auger so that these loose kernels become part of the yield. Specifically, a cushioning device is attached to each of the paddles and the paddles further support brushes or scrapers that sweep loose kernels into the auger.

18 Claims, 6 Drawing Sheets

(56) References Cited

U.S. PATENT DOCUMENTS

| | | | |
|---|---|---|---|
| 8,857,139 B1* | 10/2014 | Calmer | A01D 45/021 56/106 |
| 2012/0204528 A1* | 8/2012 | Regier | A01D 45/025 56/62 |
| 2015/0082760 A1* | 3/2015 | Zentner | A01D 45/021 56/62 |

* cited by examiner

COMBINE CORNHEAD ROW UNIT FOR REDUCING FIELD YIELD LOSSES

CROSS-REFERENCED TO RELATED APPLICATIONS

This non-provisional application claims priority to Provisional Application Ser. No. 61/912,621, filed Dec. 6, 2013, the contents of which are hereby incorporated by reference.

STATEMENT REGARDING FEDERALLY SPONSORED RESEARCH OR DEVELOPMENT

Not applicable

BACKGROUND OF THE INVENTION

I. Field of the Invention

The present invention relates generally to grain harvesting machines, and more particularly, to improved row units for harvesting combines to thereby reduce yield loss during harvesting.

II. Discussion of the Prior Art

A cornhead for a harvesting combine generally comprises a plurality of side-by-side row units that are laterally spaced from one another so as to engage adjacent rows of growing corn plants as the combine is being driven through a standing field of corn. Each row unit comprises a pair of horizontal stripper plates mounted on a frame so that a gap of a predetermined width, slightly greater than the diameter of the cornstalks to be harvested, is provided between them. Beneath the stripper plates are driven stalk rolls, sometimes referred to as "snapping rolls", that rotate so as to drag the cornstalks downward through the stripper plate gap which serves to separate the ears of corn from the stalks and husks while slicing up the stalk material. The separated ears are then carried across the top surface of the stripper plates by plural paddles that are affixed to a pair of endless, orbiting gathering chains at predetermined spacings. The chains are synchronously driven by powered drive sprockets. By this means, the ears are carried to an auger that transports the ears to a threshing station where kernels are stripped from the cobs. The cobs, as well as the stalks and husks, are ejected back onto the field.

Even when stripper plate gaps and snapping roller speed are properly set, crop losses can occur that can significantly affect a farmer's bottom line. For example, if inspection of the ground behind the combine shows only two kernels per square foot or only one ear of corn in a row, it potentially represents a loss of one bushel/acre. Thus, on a thousand acre field and with corn priced at $4.00 per bushel, it represents a loss of $4,000.00.

Studies have shown that over one-half of corn harvest losses occur at the cornhead. Shelling of corn kernels due to impact of ears on the stripper plates and conveyor paddles (termed "chatter loss") also results in loss of yield when those loose kernels are not captured, but are allowed to fall from the stripper plates to the ground.

It is accordingly a principle purpose of the present invention to provide improved row units for combine cornheads that serve to reduce yield losses of the type described above.

In prior art row units, the stripper plates are like those shown in the Calmer U.S. Pat. No. 8,171,708 or the Becker U.S. Pat. No. 6,237,312 where the rectilinear edge portions of the pair of stripper plates defining the stripper gap are inclined downward toward the ground. This allows loose kernels resulting from impact chatter to fall through to the ground. Moreover, no means are provided in the prior art for sweeping loose kernels collecting on the top surface of the stripper plates from the plates into the auger leading to the thresher so as to become part of the yield. Instead, the loose kernels vibrating off the stripper plates onto the field where they are lost.

SUMMARY OF THE INVENTION

The present invention comprises, in combination, at least one pair of replacement stripper plates, each including a planar surface with an upwardly projecting side rail extending along a rectilinear portion of the planar surface. Further included is a plurality of steel replacement paddles adapted for attachment at regularly spaced locations to first and second endless gathering chains. Impact absorbing bumpers are attached to the plurality of paddles and are adapted to reduce shatter shelling by cushioning the impacts of ears of corn against the replacement stripper plates and paddles. A plurality of sweeping brushes or scrapers are attached to the paddles and are adapted to move loose kernels from the stripper plates into the combine's thresher auger so as to become part of the yield.

BRIEF DESCRIPTION OF TEE DRAWINGS

The foregoing features, objects and advantages of the invention will become apparent to those skilled in the art from the following detailed description of a preferred embodiment, especially when considered in conjunction with the accompanying drawings in which.

DETAILED DESCRIPTION OF A PREFERRED EMBODIMENT

Figure 1:
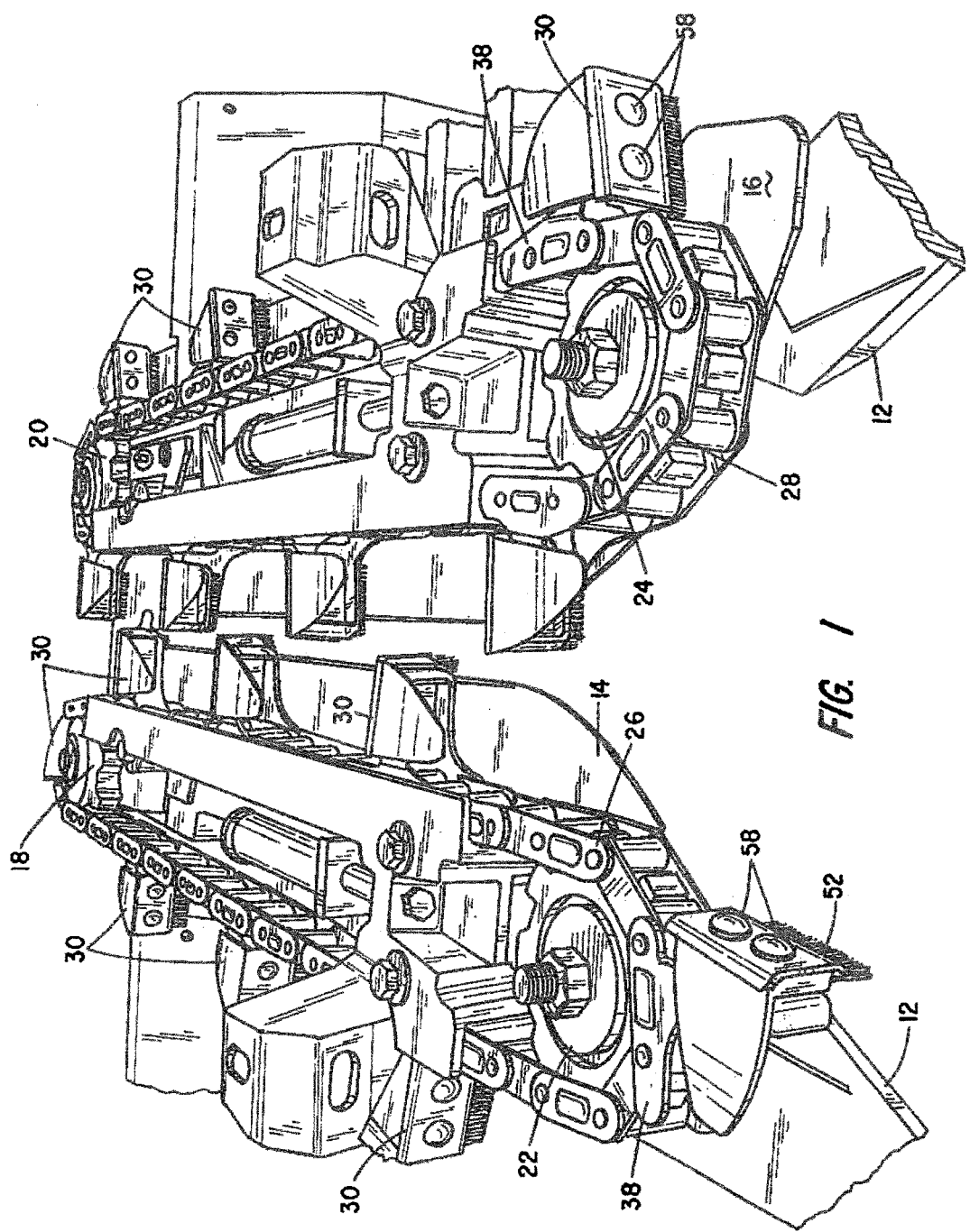
FIG. 1 is a perspective drawing of a row unit in which the components of the present invention have been installed.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring first to FIG. 1, there is shown a row unit 10 for a harvesting combine on which the components comprising the present invention have been installed. Such a combine may have as few as six and as many as thirty such row units on its cornhead. It is seen to include a frame structure 12 which supports first and second stripper plates 14/16, which are better illustrated in FIG. 2. Also mounted for rotation on the frame 12 are first and second drive sprockets 18/20 and first and second idler sprockets 22/24. Deployed about the sprockets 18 and 22 is a first endless gathering chain 26, and deployed about sprockets 20 and 24 is a second gathering chain 28.

Figure 4:
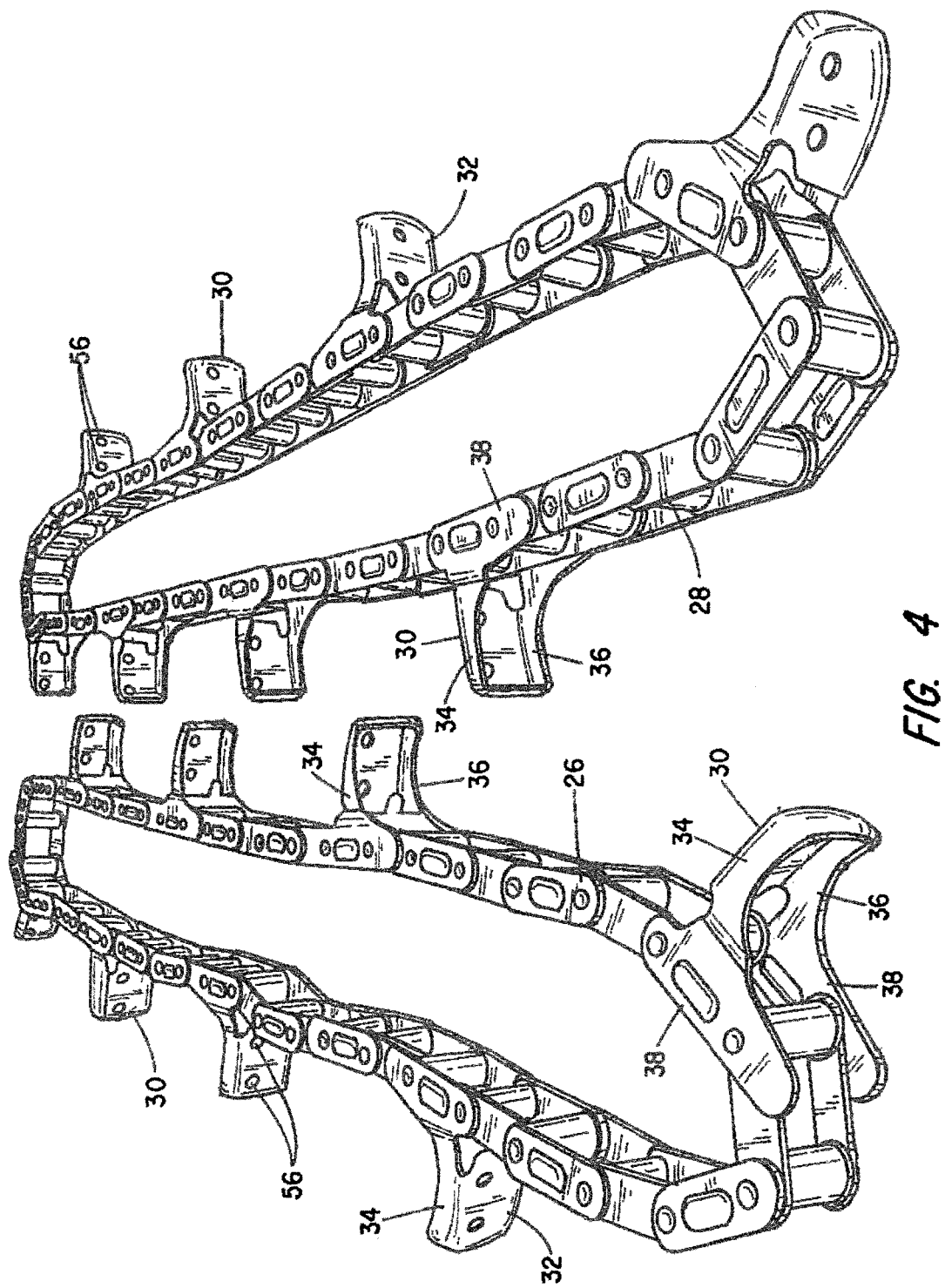
FIG. 4 is a perspective view of paddles attached to gathering chains of the row unit.

Affixed to the gathering chains 26 and 28 is a plurality of paddles 30, more clearly shown in the view of FIG. 4 where the gathering chains are shown apart from the drive and idler sprockets on the row unit 10. As seen in FIG. 4, the paddles 30 each comprise a stamped and formed steel part having a front surface 32 that is generally rectangular and that transitions by bending into top and bottom portions 34 and 36, respectively. The top and bottom portions 34/36 each terminate in foot portions that are shaped so as conform to and serve as elements of the links of the gathering chains 26 and 28, In this way, the paddles will orbit around the drive sprockets 18/20 and the idler sprockets 22/24 such that the adjacent flights of the gathering chains move in the same direction and carry the paddles 30 directly over adjacent portions of the stripper plates 14 and 16.

Figure 2:
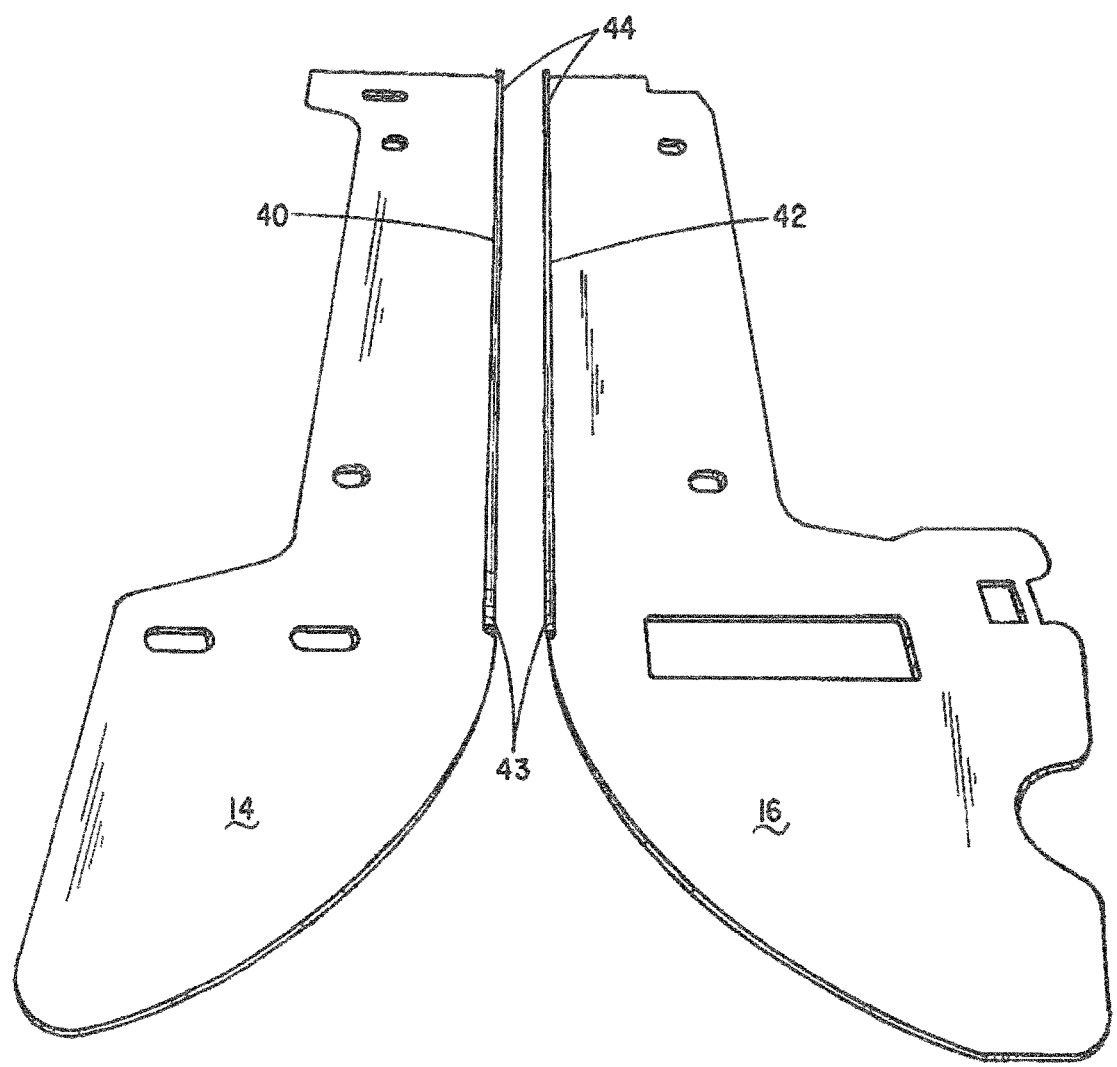
FIG. 2 is a perspective view of the stripper plates configured in accordance with the present invention.

Referring momentarily to FIG. 2, the stripper plates 14 and 16 are bolted to the frame 10 such that rectilinear edge portions 40/42 define a gap therebetween in which standing cornstalks are designed to enter. Located beneath the stripper plates is a pair of snapping rolls (not shown) of the type found on most commercial cornheads on the market today. The snapping rolls are driven at a rotational speed keyed to the speed of travel of the combine through the field being harvested and serve to drag the stalks vertically downward through the gap between the two adjacently positioned stripper plates. Because the gap is smaller than the diameter of the ears of corn, upon reaching the stripper plates, the ears of corn are stripped from the stalks and surrounding husks with the ears forcibly landing on the stripper plate and then being engaged by the paddles and pushed into an auger conveyor that extends transverse to the plurality of cornhead row units and that moves the ears to a threshing station where kernels are shelled off their cobs.

Figure 3:
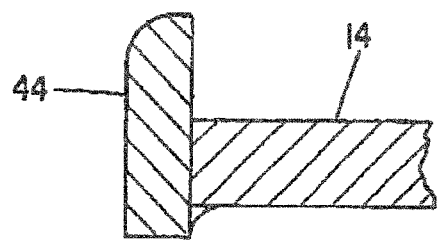
FIG. 3 is a transverse sectional view of the guard rail welded to the stripper plates' facing edges.

In the prior art, the stripping operation subjected the ears of corn to violent impacts with both paddles and the stripping plates and this often resulted in kernels coming loose from the cobs and then falling through the gap between the stripper plates to the ground so as to constitute a loss of yield. Referring again to FIG. 2, rather than bending the edges 40/42 of the stripper plates downward as in prior art machines previously referred to, the guard rails 44 are welded to the edges 40/42 by weld beads located only on the undersurface of the stripper plates. The guard rails are designed to project upward approximately ¼ inch above the upper surface of the stripper plates. The outer surfaces of the guard rails 44 are preferably slightly rounded as seen in FIG. 3. This helps to prevent stalks from being cut off before engaging with the cornhead's snapping rollers. Also, the leading edge portions of the guard rails are tapered as indicated by reference numeral 43 in FIG. 2. The raised edge provided by the guard rails serves to inhibit loose kernels from dropping off the top surface of the stripper plates.

In tests which were conducted comparing cornheads of the prior art with ones incorporating the present invention, it was found that the deck plates 14/16 with the guard rails 44 improved crop flow, especially when the cornstocks are wet and tough or when the cornstocks get blown over before harvest. The rails 14/16 lift the stocks to reduce row plugging. The tests further showed that, when combining stressed, small cob corn, the deck plate design of the present invention is better able to strip and retain small cobs than combines employing the prior art stripper plates. It was determined that, when small cobs are stripped, the guard rails 44 engaged the small cobs to catch the rear edge portions of the stripper plate gap. The added angle friction was found to be sufficient to retain small cobs and reduce cob pull-through, even though in harvesting stressed corn it is more difficult to separate ears from the stock.

Figure 5:
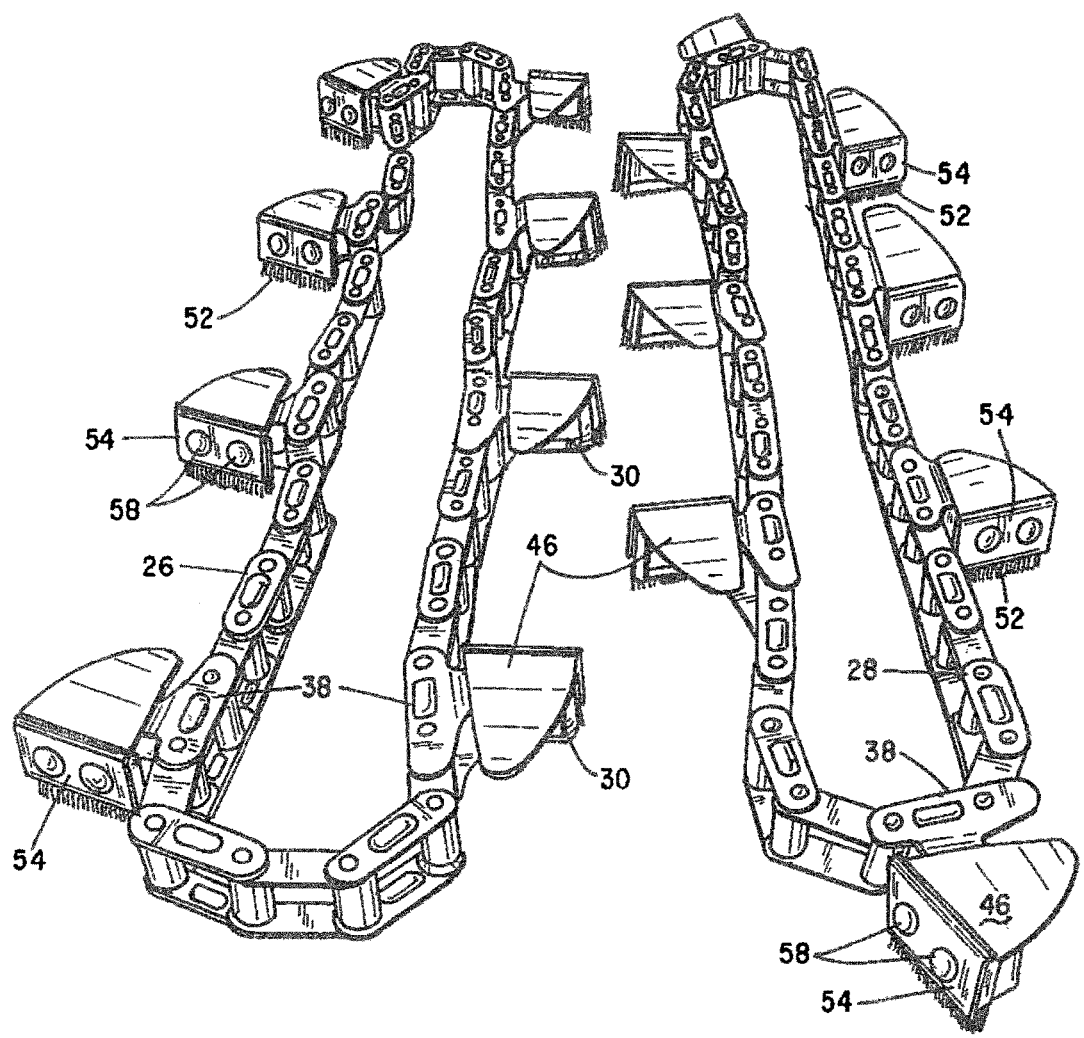
FIG. 5 is a perspective view of the gathering chain with impact-absorbing bumpers and sweeps attached to each of the paddles.

To minimize shelling of kernels due to impact, i.e., so-called "chatter", the present invention modifies the paddles by adding a cushioning element thereto. Specifically, and as seen in FIGS. 1, 5 and 6, the cushioning element comprises an L-shaped piece 46 of a molded polyurethane (or other suitable plastic exhibiting superior wear-resistance due to abrasion) having a first leg 48 clamped to the front face surface 32 of the paddles such that its second leg 50 extends over the top surface 34 of the paddle and is cantilevered over the spacing between adjacent paddles, all as can be seen in FIGS. 1 and 5.

As ears of corn are stripped from their stalks, they impinge on the overhanging legs 46 where kinetic energy of the ears is dissipated, resulting in reduced shelling due to chatter.

To move a significant percentage of loose kernels that may result and that are retained on the stripper plate by the presence of the guard rails 44 on the adjacent edges thereof, there is also provided on the bottom portion of the first leg 48 of the plastic cushion member 46, either a brush, as at 52, or a wiper that projects down onto the top surface of the stripper plates. As the gathering chains orbit around their drive and idler sprockets, the loose kernels accumulating on the stripper plates are swept into the collection auger of the combine (not shown) and thereby become part of the harvested yield.

Figure 6:
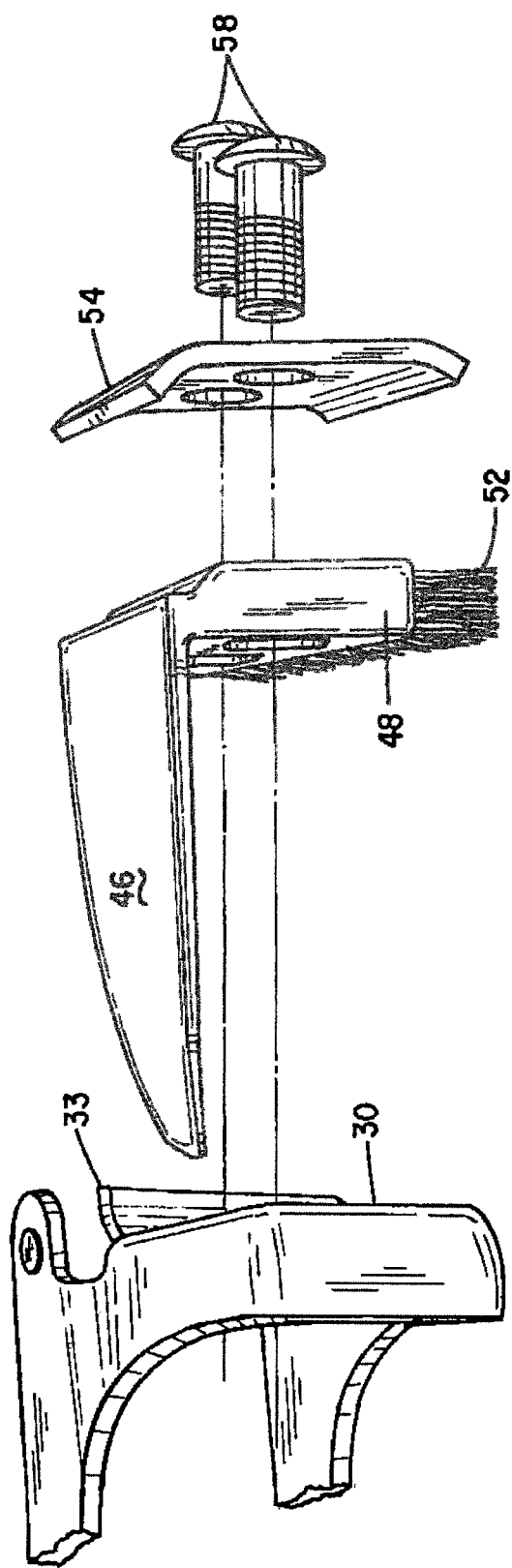
FIG. 6 is an exploded view of a paddle of FIG. 5.

In the exploded view of FIG. 6, one can observe the manner in which the plastic cushion 46 and associated brush 52 are mounted to the back surface 32 of the paddles so that the brush 52, or other wiper that may be substituted, can be periodically adjusted for wear. Here, a clamping plate 54 has at least one, and preferably two, apertures that become aligned with vertical, elongate slots formed through the first leg 48 of the plastic cushion member 46 and also with a pair of apertures through the front portion 32 of the steel paddles. Stove bolts 58 are made to pass through these aligned apertures and held tight by nuts threaded onto the bolts.

When, over a period of time, the brush bristles or substitute wiper become worn, by loosening the nuts, pressure of the clamping plate on the cushion member 46 is relieved, allowing one to slide the slotted first leg 48 downward to again bring the brush or wiper into engagement with the top surface of the stripper plates 14/16 before retightening the nuts on the bolts 58.

With continued reference to FIG. 6, It should be noted that the front portion 32 includes a forward projecting flange 33 at an angle of about 90° which cooperates with the impact cushioning elements 46 for maintaining them square on the front portions 32 of the paddles 30. The flange 33 is also found to steer loose kernels from beneath the chains into the path of the brushes 52 and serves as a kernel direction vane.

Not only may components of the present invention be factory installed, but it is also contemplated that they can be sold as a kit to farmers having cornheads on original equipment purchased from various commercial suppliers, such as the John Deere Company, New Holland Machine Company, Case Equipment and others. The kits would include substitute stripper plates having hole patterns for mounting on the frames of the particular manufacturer model that the farmer may own. These stripper plates, of course, would include the guard rails 44 welded in place as earlier described. The kit will also contain a requisite number of replacement paddles 30 needed for the particular machine to be modified along with a number of cushion members 46, clamping plates 54, bolts 58 and nuts required. The equipment owner can then replace existing paddles on the machine's existing gathering chains with the paddles 30 of the present invention and with the cushion/brush combination previously described mounted to the paddles in the manner described.

When it is considered that John Deere Company first introduced a combine with a cornhead in 1954 and that tests conducted by or on behalf of the present applicant have shown an 85% reduction of field loss of kernels due to chatter by cornheads incorporating the novel features of the present invention over cornheads of the prior art, it suggests that the present invention is a non-obvious advance in the art, especially when the economic savings inherent in the use of applicant's modifications are factored in.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices.

What is claimed is:

1. In a row unit for a combine cornhead, a combination comprising:
   (a) first and second flat stripper plates mounted to a frame in coplanar relationship with adjacent rectilinear edges of the first and second stripper plates spaced apart from one another by a gap, said stripper plates each including a steel guard rail along the rectilinear edges defining the gap extending upward from a top surface of the stripper plates;
   (b) a plurality of paddles affixed to a pair of endless gathering chains, said gathering chains extending around drive sprockets disposed proximate a first end of the first and second stripper plates and about idler sprockets disposed proximate a second end of the first and second stripper plates wherein the pair of gathering chains are positioned such that paddles on adjacent flights of the pair of gathering chains extend inward from and above the guard rails; and
   (c) means for cushioning impacts between corn ears being harvested and the paddles and stripper plates and means for sweeping loose kernels from the stripper plates.

2. In a row unit for a combine cornhead having first and second flat stripper plates mounted to a frame in coplanar relationship with adjacent rectilinear edges of the first and second stripper plates spaced apart from one another by a gap; driven stock snap rollers disposed below the stripper plates and longitudinally aligned with the gap for drawing cornstalks down through the gap for separating corn ears from their stocks; a pair of endless gathering chains extending around drive sprockets disposed proximate a first end of the first and second stripper plates and about idler sprockets disposed proximate a second end of the first and second stripper plates; a plurality of paddles joined to the gathering chains for moving corn ears separately from their stocks to a conveyor adapted to carry corn ears to a shelling station wherein the improvement comprises:
   a plurality of cushion members operatively coupled to the pair of endless gathering chains and disposed such that corn ears being stripped from cornstalks by the stripper plates engage the cushion member before striking the paddles and stripper plates for reducing butt shelling of kernels from the ears and flexible wipers affixed to the cushion members for moving corn ears and any loose kernels of corn to said conveyor.

3. In a row unit for a combine cornhead, a combination comprising:
   a) a pair of gathering chains, each surrounding a pair of longitudinally aligned and spaced apart chain sprockets journaled for rotation to a frame to define inner and outer flights on the gathering chains, the gathering chains each having paddles affixed to spaced-apart links of the gathering chains;
   b) a plurality of cushioning members joined to the paddles so as to cushion impacts between corn ears being harvested and the paddles; and
   c) the cushioning members supporting brush bristles.

4. In a row unit for a combine cornhead, a combination comprising:
   (a) first and second flat stripper plates mounted to a frame in coplanar relationship with adjacent rectilinear edges of the first and second stripper plates spaced apart from one another by a gap, said stripper plates each including a guard rail along the rectilinear edges defining the gap and extending upward from a top surface of the stripper plates;
   (b) a plurality of paddles affixed to a pair of endless gathering chains, said gathering chains each extending inwardly around a drive sprocket disposed proximate a first end of the first and second stripper plates and about an idler sprocket disposed proximate a second end of the first and second stripper plates, wherein the pair of gathering chains are positioned such that paddles on adjacent flights of the pair of gathering chains extend inward from and above the guard rails; and
   (c) a cushioning element comprising a generally L-shaped resilient plastic member having a first leg clamped to a front surface of the paddles and a second leg extending over and beyond a top surface of the paddles.

5. The combination of claim 4 and further including sweep means affixed to the paddles.

6. The combination of claim 5 wherein the means for sweeping loose kernels comprises one of a brush member and a scraping member extending below a bottom surface of the paddle for engaging the top surfaces of the first and second flat stripper plates as the gathering chains orbit about said drive sprockets and idler sprockets.

7. In a row unit for a combine cornhead, a combination comprising:
   (a) first and second flat stripper plates mounted to a frame in coplanar relationship with adjacent rectilinear edges of the first and second stripper plates spaced apart from one another by a gap, said stripper plates each including a guard rail along the rectilinear edges defining the gap and extending upward from a top surface of the stripper plates, said guard rails each comprising an elongate steel strip of generally rectangular cross-section, except for a radiused upper edge and a tapered leading edge portion, the guard rails being attached individually to said rectilinear edges of the first and second stripper plates; and
   (b) a plurality of paddles affixed to a pair of endless gathering chains, said gathering chains each individually extending around a drive sprocket disposed proximate a first end of the first stripper plate and about an idler sprocket disposed proximate a second end of the first stripper plate and about a drive sprocket disposed about a first end of the second stripper plate and an idler sprocket disposed proximate a second end of the second stripper plate, wherein the pair of gathering chains are positioned such that paddles on adjacent flights of the pair of gathering chains extend inward from and above the guard rails.

8. The combination of claim 7 and further including:
(a) cushioning means affixed to the paddles.

9. The combination of claim 8 wherein the cushioning means comprises a resilient plastic cover individually positioned over each of the paddles.

10. The combination of claim 7 and further including sweep means affixed to the paddles.

11. The combination of claim 8 and further including sweep means affixed to the paddles.

12. The combination of claim 7 and further including means for cushioning impacts between corn ears being harvested and the paddles and stripper plates and means for sweeping loose kernels from the stripper plates.

13. The combination of claim 12 wherein the means for cushioning impacts comprises a generally L-shaped resilient plastic member having a first leg clamped to a front surface of selected ones of the paddles and a second leg extending over and beyond a top surface of the selected paddles.

14. The combination of claim 12 wherein the means for sweeping loose kernels comprises one of a brush member and a scraping member extending below a bottom surface of the paddles for engaging the top surface of the first and second flat stripper plates as the gathering chains orbit about said drive sprockets and idler sprockets.

15. The combination of claim 13 wherein the first leg of the L-shaped resilient plastic member is clamped to the front surface of the selected paddles by a clamping plate that is affixed to the selected paddles by at least one through-bolt.

16. The combination of claim 15 wherein the through-bolt extends through an elongated aperture in the first leg of the resilient plastic member.

17. A deck plate for a combine cornhead comprising:
a planar steel sheet of a predetermined thickness dimension having a top surface, a bottom surface and a rectilinear edge extending from a rear end of the sheet toward, but short of, a front end portion of the sheet, said front end portion having an arcuate edge extending rearward and smoothly joining the rectilinear edge; and
a steel guard rail of rectangular cross-section attached at least to the rectilinear edge of the sheet by weld beads formed between said bottom surface and said guard rail with said guard rail extending perpendicularly upward from said top surface such that no weld beads exist between the top surface of the sheet and the guard rail.

18. The deck plate of claim 17 wherein the guard rail includes a radiused upper outer corner.

* * * * *